US010063902B2

(12) United States Patent
Pichon et al.

(10) Patent No.: US 10,063,902 B2
(45) Date of Patent: Aug. 28, 2018

(54) ABR NETWORK PROFILE SELECTION ENGINE

(71) Applicant: Cisco Technology, Inc., San Jose, CA (US)

(72) Inventors: Mathieu Pichon, Paris (FR); Gabriel Bouvigne, Paris (FR); Alexis Gallet De Saint-Aurin, Versailles (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/389,305

(22) Filed: Dec. 22, 2016

(65) Prior Publication Data

US 2018/0184145 A1    Jun. 28, 2018

(51) Int. Cl.
*H04N 7/173* (2011.01)
*H04N 21/2662* (2011.01)
(Continued)

(52) U.S. Cl.
CPC ....... *H04N 21/2662* (2013.01); *H04N 21/234* (2013.01); *H04N 21/2402* (2013.01);
(Continued)

(58) Field of Classification Search
CPC ........... H04N 21/2662; H04N 21/2407; H04N 21/2402; H04N 21/4722; H04N 21/4532; H04N 21/234
(Continued)

(56) References Cited

U.S. PATENT DOCUMENTS

| 8,930,991 B2 | 1/2015 | Philpott et al. |
| 9,277,289 B2 | 3/2016 | Medford et al. |

(Continued)

FOREIGN PATENT DOCUMENTS

| EP | 1842337 B1 | 10/2016 |
| WO | 2006077500 A1 | 7/2006 |
| WO | 2012021543 A1 | 2/2012 |

OTHER PUBLICATIONS

Houdaille, R. et al., "Shaping HTTP adaptive streams for a better user experience", Proceedings of the 3rd Multimedia Systems Conference, Feb. 22-24, 2012, Chapel Hill, North Carolina, USA (abstract only). <http://dl.acm.org/citation.cfm?id=2155557>.

(Continued)

*Primary Examiner* — Michael B Pierorazio
(74) *Attorney, Agent, or Firm* — Patterson + Sheridan, LLP

(57) ABSTRACT

Embodiments provide techniques for optimizing ABR profiles for broadcast channels at a network gateway device. Embodiments include monitoring, at a network gateway device for a network, a plurality of client devices within the network to determine adaptive bitrate (ABR) streaming information for a first broadcast channel of a plurality of broadcast channels. One or more performance attributes of the network are determined. Embodiments include selecting one or more ABR profiles, of a plurality of ABR profiles for the first broadcast channel, based on the ABR streaming information and the one or more performance attributes of the network. An updated manifest file specifying the selected one or more ABR profiles for the first broadcast channel is generated, and the updated manifest file is transmitted to the plurality of client devices.

16 Claims, 12 Drawing Sheets

(51) Int. Cl.
 H04N 21/45 (2011.01)
 H04N 21/4722 (2011.01)
 H04N 21/234 (2011.01)
 H04N 21/24 (2011.01)
(52) U.S. Cl.
 CPC ..... *H04N 21/2407* (2013.01); *H04N 21/4532* (2013.01); *H04N 21/4722* (2013.01)
(58) Field of Classification Search
 USPC ........................................................ 725/116
 See application file for complete search history.

(56) References Cited

U.S. PATENT DOCUMENTS

| | | |
|---|---|---|
| 9,332,051 B2 | 5/2016 | Brueck et al. |
| 2005/0149988 A1 | 7/2005 | Grannan |
| 2011/0188439 A1* | 8/2011 | Mao .................. H04N 7/17318 370/312 |
| 2014/0215085 A1 | 7/2014 | Li et al. |
| 2014/0282777 A1* | 9/2014 | Gonder ................. H04L 65/605 725/109 |

OTHER PUBLICATIONS

Akhshabi, S., et al., "What Happens When HTTP Adaptive Streaming Players Compete for Bandwidth?", NOSSDAV'12, Jun. 7-8, 2012, Toronto, Ontario, Canada, 6 pages. <http://www.cc.gatech.edu/~dovrolis/Papers/final-nossdav12.pdf>.

Liu, X., et al., "QoE-aware Traffic Shaping for HTTP Adaptive Streaming", International Journal of Multimedia and Ubiquitous Engineering, vol. 9, No. 2 (2014), pp. 33-44. <http://www.sersc.org/journals/IJMUE/vol9_no2_2014/4.pdf>.

Li, Z., et al., "Probe and Adapt: Rate Adaptation for HTTP Video Streaming at Scale", IEEE Journal on Selected Areas in Communications, vol. 32, Issue 4, Apr. 2014 (abstract only). <http://ieeexplore.ieee.org/document/6774592/?section=abstract>.

\* cited by examiner

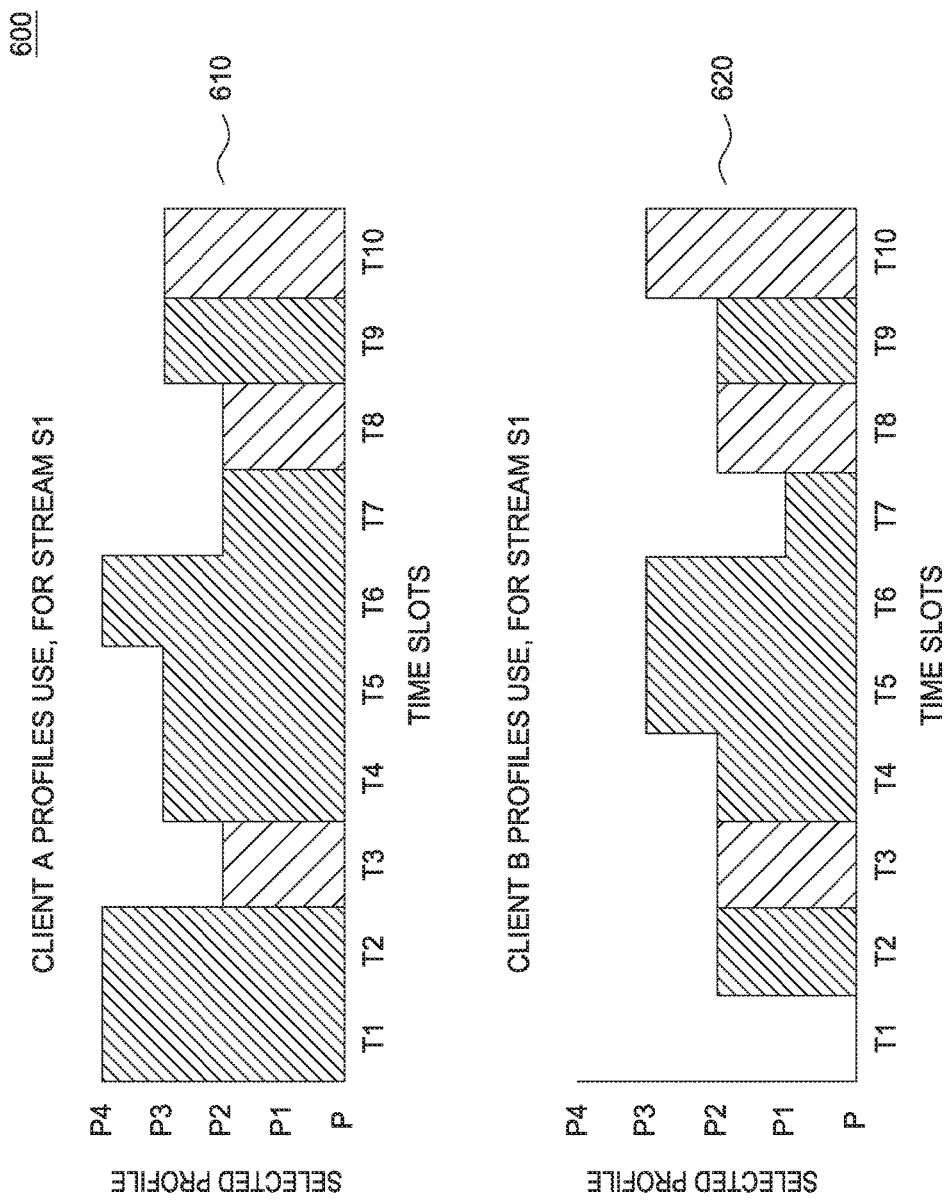

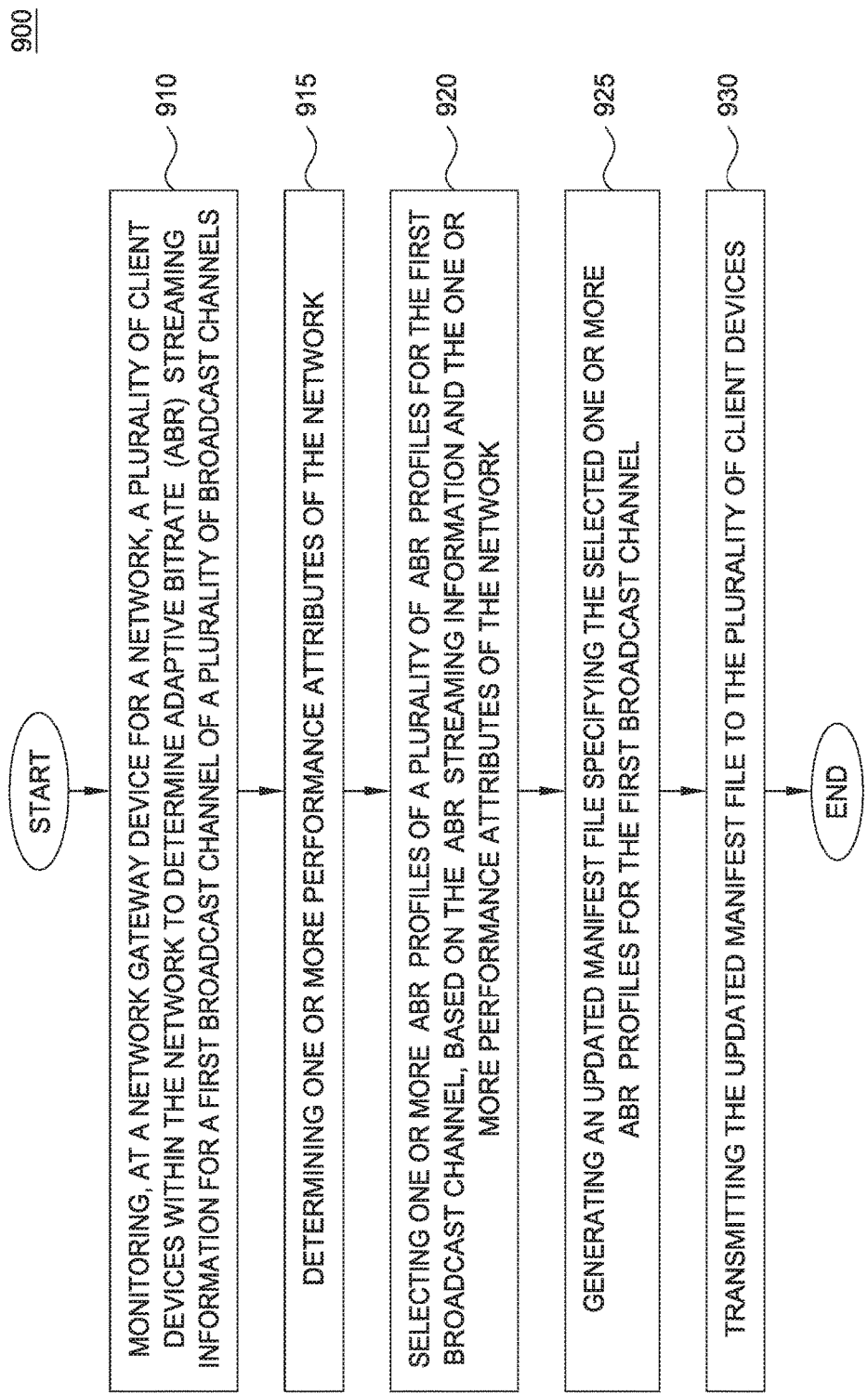

ABR NETWORK PROFILE SELECTION ENGINE

TECHNICAL FIELD

Embodiments presented in this disclosure generally relate to streaming content, and more specifically, embodiments disclosed herein relate to techniques for optimizing ABR streams within a network.

BACKGROUND

As video transmission systems have matured, digital video is more readily available via a variety of different communications systems and networks. Specifically, digital video, such as television programs, can be transmitted as multicast digital bit streams of video signals to users over networks. Multicast digital bit streams typically include digital video frames. A predetermined number of frames is conventionally referred to as a Group of Pictures (GOP). The GOP lengths are typically 15 or 30 frames. With more advanced video formats, such as Advanced Video Coding (AVC) and/or Windows Media 9 (WM9), the GOP length can be substantially longer in order to reduce the bit rate.

In order to reduce costs and simplify the amount of effort associated with video transmission, different video compression/de-compression techniques have been developed and established. Some of the better known and more widely adopted video compression/de-compression standards include Motion Picture Experts Group 2 (MPEG-2) data streams and Motion Picture Experts Group 4 (MPEG-4) data streams. Hence, television programs are often transmitted over the network as Motion Picture Experts Group 2 (MPEG-2) data streams or Motion Picture Experts Group 4 (MPEG-4) data streams. Conventionally, for purposes of video compression/decompression, a video stream is processed one frame at a time.

Compressed video transmission streams typically include a variety of different compression frame types. With MPEG-2 and MPEG-4, the bit streams generally include three different types of frames including Intra-frames, Predictive frames, and Bidirectional interpolated frames. In a typical decoding process, Intra-frames (I-frames) can be decoded independently without the need of referencing another frame. Thus, GOPs typically start with an I-frame. Predictive frames (P-frames) can be decoded by referencing a previous I-frame or P-frame. Bidirectional interpolated frames (B-frames) can be predicted from a previous and a following P-frame or I-frame. For a given video stream, all three ways of coding are attempted and the best and most efficient combination is utilized. For example, a common MPEG-2 video stream can be 15 frames long and have the sequence IBBPBBPBBPBBPBB.

Typically, a video stream, such as a MPEG-2 data stream, is transmitted from a multicast source to a router and/or switch via a network, e.g., an Internet Protocol (IP) distribution network. And upon receipt of the video stream, the router then transmits the video stream to a user device, such as a set-top box. Such a router (e.g., the user's Internet gateway) can potentially receive multiple multicast video streams at one time (e.g., one or more streams for each of a plurality of broadcast channels), and client devices (e.g., dedicated streaming devices such as the set-top box, mobile devices, tablet devices, etc.) can request specific streams to be output for display.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-B are bar graphs illustrating ABR profiles selected by client devices, according to embodiments described herein.

FIG. 9 is a flow diagram illustrating a method of selecting one or more ABR profiles for a broadcast channel within a network, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
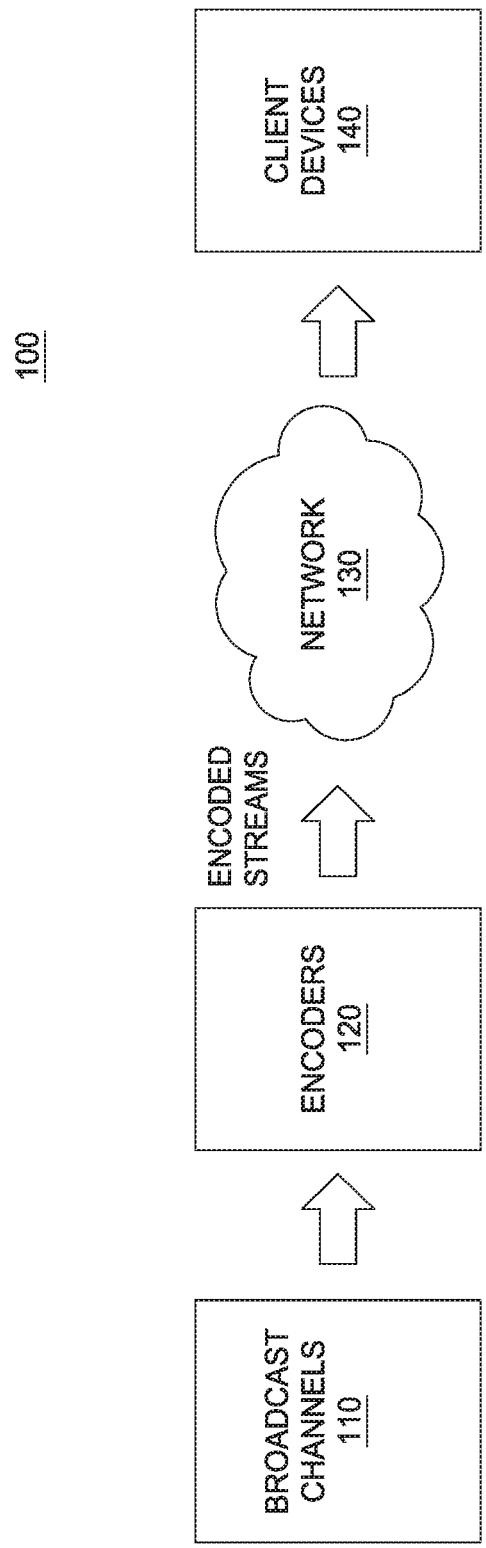
FIG. 1 illustrates a system for delivering encoded video streams to client devices, according to one embodiment described herein.

One embodiment presented in this disclosure provides a method that includes monitoring, at a network gateway device for a network, a plurality of client devices within the network to determine adaptive bitrate (ABR) streaming information for a first broadcast channel of a plurality of broadcast channels. The method includes determining one or more performance attributes of the network. The method also includes selecting one or more ABR profiles, of a plurality of ABR profiles for the first broadcast channel, based on the ABR streaming information and the one or more performance attributes of the network. Additionally, the method includes generating an updated manifest file specifying the selected one or more ABR profiles for the first broadcast channel. The method further includes transmitting the updated manifest file to the plurality of client devices.

Another embodiment presented in this disclosure provides a network device that includes one or more computer processors and logic that performs an operation. The operation includes monitoring, at the network gateway device, a plurality of client devices within the network to determine adaptive bitrate (ABR) streaming information for a first broadcast channel of a plurality of broadcast channels. The operation includes determining one or more performance attributes of a network. The operation also includes selecting one or more ABR profiles, of a plurality of ABR profiles for the first broadcast channel, based on the ABR streaming information and the one or more performance attributes of the network. Additionally, the operation includes generating an updated manifest file specifying the selected one or more ABR profiles for the first broadcast channel. The operation further includes transmitting the updated manifest file to the plurality of client devices.

Yet another embodiment presented in this disclosure provides a non-transitory computer-readable medium containing computer program code that, when executed by operation of one or more computer processors, performs an operation. The operation includes monitoring, at a network gateway device for a network, a plurality of client devices within the network to determine adaptive bitrate (ABR) streaming information for a first broadcast channel of a plurality of broadcast channels. The operation includes determining one or more performance attributes of a network. The operation also includes selecting one or more ABR profiles, of a plurality of ABR profiles for the first broadcast channel, based on the ABR streaming information and the one or more performance attributes of the network. Additionally, the operation includes generating an updated manifest file specifying the selected one or more ABR profiles for the first broadcast channel. The operation further includes transmitting the updated manifest file to the plurality of client devices.

Example Embodiments

In many instances, content providers can provide multiple Adaptive Bitrate (ABR) streams for a single broadcast channel. Generally speaking, multiple different ABR streams (e.g., at varying bitrates) can be provided for each of a plurality of broadcast channels, and client devices can be configured with logic to select one of the ABR streams that is optimal for the given client device. That is, it is generally preferable for a client device to display the highest quality video stream possible, and since network resources and processing capabilities can vary greatly between client devices, the optimal video stream can vary greatly between client devices. As an example, a very high bitrate encoding may be optimal for a dedicated streaming device on a high-speed network, while a relatively lower bitrate encoding may be optimal for a mobile device on a mobile network. As such, by providing multiple encodings at varying bitrates for each broadcast channel, content providers can better ensure that client devices can retrieve a stream that is close to optimal for the particular client device.

However, within a given network (e.g., a home network, an enterprise network, etc.), multiple different client devices can be attempting to stream ABR content, and can potentially be competing for network resources with one another. For example, a first client device could be attempting to watch a broadcast channel using a high bitrate ABR stream, while a second client device could be attempting to watch the broadcast channel using a moderate bitrate ABR stream. However, the network's uplink to the Internet may not have sufficient bandwidth to retrieve the high bitrate ABR stream and the moderate bitrate ABR stream simultaneously. As a result, both the first and second client devices may ultimately end up retrieving non-optimal ABR streams, and/or may suffer from degraded performance (e.g., due to the client devices constantly changing ABR streams, due to the contention between the client devices).

As such, embodiments described herein provide techniques for optimizing ABR profile requests for a network. One embodiment includes monitoring, at a network gateway device for a network, a plurality of client devices within the network to determine adaptive bitrate (ABR) streaming information for a first broadcast channel of a plurality of broadcast channels. For example, the network gateway device could monitor data packets (e.g., from the client devices being sent to a content distribution server) to determine which ABR profiles are being requested for the first broadcast channel.

Embodiments could also determine one or more performance attributes of the network. For example, the network gateway device could determine a measure of network bandwidth for the network, a measure of available network throughput for the network, a measure of congestion for an upstream network link of the network gateway device (e.g., a network link of an upstream device along the path between the network gateway device and a content distribution server), and so on.

Embodiments can then select one or more ABR profiles, of a plurality of ABR profiles for the first broadcast channel, based on the ABR streaming information and the one or more performance attributes of the network. For example, logic on the network gateway device could determine that, while the uplink connection for the network does not have sufficient throughput to support both the high bitrate ABR stream and the medium bitrate ABR stream for the broadcast channel, the uplink connection does have sufficient throughput to retrieve data packets of the high bitrate ABR stream in a timely fashion (i.e., in time for playback of the encoded portions of the video stream).

As such, the logic on the network gateway device could generate an updated manifest file specifying the selected one or more ABR profiles for the first broadcast channel. Generally, the manifest files specifies, in part, one or more ABR streams that are available for each of one or more broadcast channels from a content distribution provider. For example, the logic on the network gateway device could generate an updated manifest file that specifies that only the selected one or more ABR profiles are available for the first broadcast channel, and could transmit the updated manifest file to the client devices on the network. By doing so, the logic on the network gateway device can indirectly cause the client devices on the network streaming the first broadcast channel to select between the one or more ABR profiles for the first broadcast channel, even though additional ABR profiles may be offered by the content distribution provider for the first broadcast channel. Doing so ensures that the client devices select an ABR profile that is optimal for the network as a whole, without requiring the client devices on the network to be configured with any specialized logic for doing so and without requiring the client devices on the network to communicate with one another.

FIG. 1 illustrates a system for delivering encoded video streams to client devices, according to one embodiment described herein. As shown, the system 100 includes a plurality of broadcast channels 110, a plurality of encoders 120, a network 130 and a plurality of client devices 140. Generally, a master video stream is provided for each of the broadcast channels 110. Such a master video stream is typically a high resolution video stream containing video content for the corresponding broadcast channel. The encoders 120 can then process the master video streams for the broadcast channels 110 in order to produce encoded ABR video streams. For example, three of the encoders 120 could be assigned to a particular one of the broadcast channels 110, and each of the three encoders could be configured to transcode the master video stream for the broadcast channel at a different bitrate. As an example, the three encoders could be configured to encode the master video stream for the broadcast channel at a relatively high bitrate, a relatively moderate bitrate and a relatively low bitrate.

The encoded streams could then be transmitted to the client devices 140 using the network 130. In doing so, the content provider could generate a manifest file specifying that the particular broadcast channel is available in the three different bitrates, and could transmit such a manifest file to the client devices 140 using the network 130. Each of the client devices 140 could be configured to process the manifest file and to determine which of the available bitrates is optimal for the particular client device. For example, a mobile client device could be configured to select the relatively low bitrate encoding, while a dedicated video streaming device on a high-speed network connection could be configured to select the relatively high bitrate encoding. Depending on the performance of the streaming of the selected encoding, the client devices could then dynamically adjust their selected encoding. Continuing the above example, if the mobile client device determines that data packets for the video stream are arriving well in advance of their playback time, the mobile client device could request to begin receiving data packets from the moderate bitrate encoding stream. As another example, if the dedicated streaming client device determines that packets are not arriving as quickly as expected and that buffer underrun is likely to occur, the dedicated streaming client device could request to begin receiving data packets from the moderate bitrate encoding stream.

As a general matter, each of the client devices 140 may be configured with logic to select an ABR profile to download for a given broadcast channel 110, based on performance attributes of the respective client device (e.g., a measure of available network throughput for the client device). However, while such decisions may be optimal with respect to the information available to the respective client device, the decisions may not be optimal for a network as a whole (e.g., a local area network in a user's home, an enterprise network with multiple streaming client devices, etc.). To this end, multiple client devices within a network may compete with each other for network resources, leading to a situation where the client devices repeatedly shift between ABR profiles.

Figure 2:
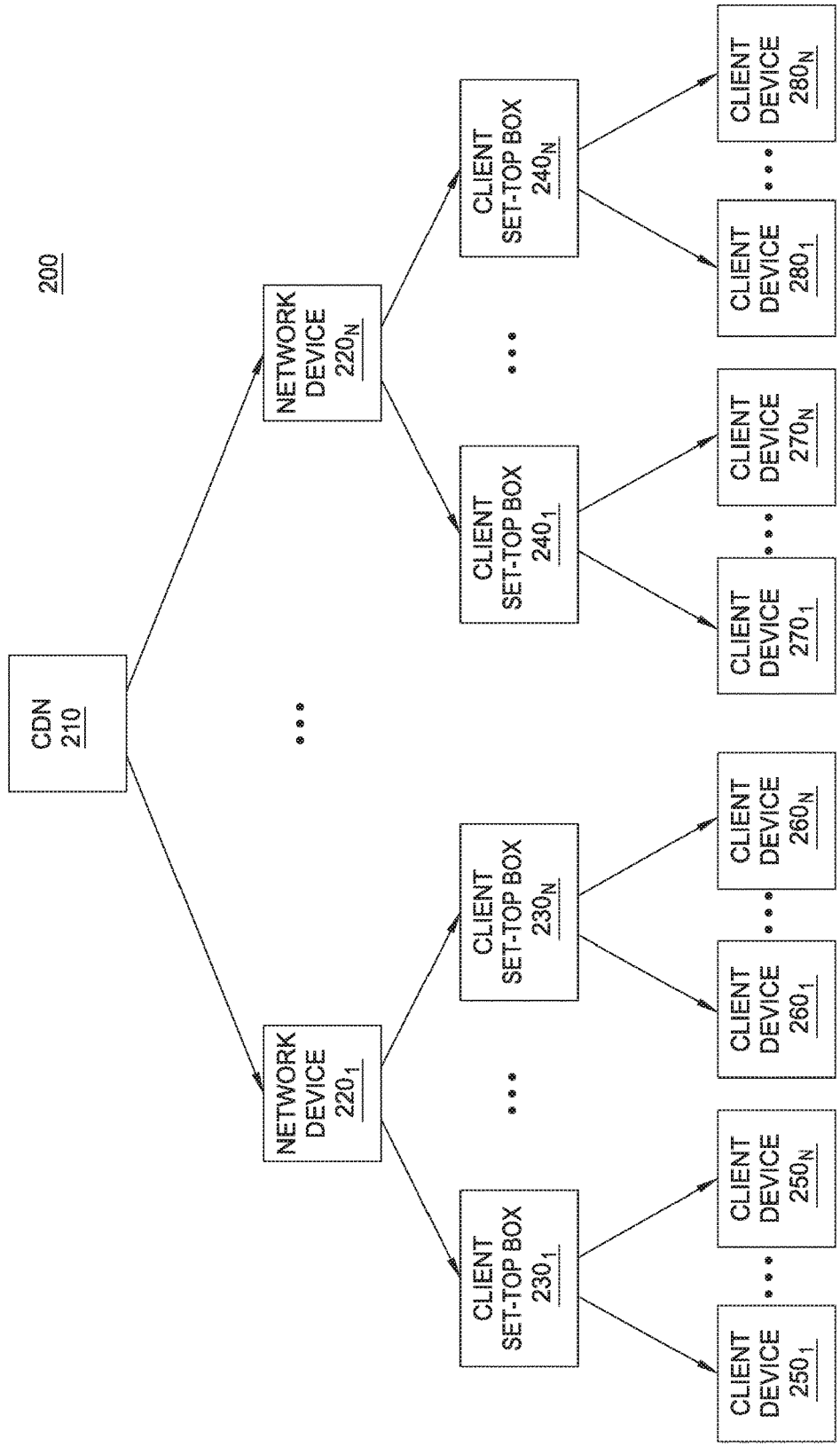
FIG. 2 illustrates a network topology for delivering encoded video streams to client devices, according to one embodiment described herein.

Generally, the encoded video streams generated by the encoders 120 can be transmitted to the client devices 140 using the network 130 in a number of different ways. One such way is through multicast communications, where particular encoded video streams are transmitted to all subscribing network devices within the network. FIG. 2 illustrates a network topology for delivering encoded video streams to client devices, according to one embodiment described herein. As shown, the network topology 200 includes a CDN 210, network devices $220_{1-N}$, client set-top boxes $230_{1-N}$ and $240_{1-N}$, and client devices $250_{1-N}$, $260_{1-N}$, $270_{1-N}$, and $280_{1-N}$. In the depicted example, the client set-top boxes $230_{1-N}$ and $240_{1-N}$ are configured to also serve as a router for a home network. Thus, for example, the client set-top box $240_1$ is configured to act as a router for the client device $270_{1-N}$.

In the depicted example, if the client device $270_1$ requests a particular encoded video stream for a particular broadcast channel, the client set-top box $240_1$ can be configured to subscribe to multicast transmissions from the network device $220_N$ for the particular encoded video stream. In turn, the network device 220N can subscribe to multicast transmissions from the CDN 210 for the particular encoded video stream. One advantage to such an embodiment is that the data packets for the particular encoded video stream can more easily be delivered to additional devices within the network topology 200. For example, if the client device $270_N$ also requests the particular encoded video stream for the particular broadcast channel, the client set-top box $240_1$ can simply provide the client device $270_N$ with the data packets for the particular encoded video stream already being received due to the client device $270_1$'s request. In other words, the particular encoded video stream can be provided to the client device $270_N$ without creating an additional network connection with the CDN 210, thereby reducing the workload on the CDN 210, the network device $220_N$ and the client set-top box $240_1$.

In some instances, the client set-top boxes $230_{1-N}$ and $240_{1-N}$ are configured to subscribe to multicast transmissions for at least one video stream for each of the broadcast channels 110. In turn, the network devices $220_{1-N}$ can subscribe to multicast transmissions for the at least one video stream for each of the broadcast channels 110. While such an embodiment creates a constant flow of network traffic between the CDN 210 and the network devices $220_{1-N}$, and between the network devices $220_{1-N}$ and the client set-top boxes $230_{1-N}$ and $240_{1-N}$, it enables any of the client devices $250_{1-N}$, $260_{1-N}$, $270_{1-N}$, and $280_{1-N}$ to retrieve data packets for the requested video streams from the corresponding client set-top box, using a local (and much faster) network connection. Moreover, regardless of the number of client devices $250_{1-N}$, $260_{1-N}$, $270_{1-N}$, and $280_{1-N}$, the workload on the CDN 210 remains constant, unlike conventional solutions where each of the client devices is configured to establish a separate network connection with the CDN 210 for streaming video content. As such, by transmitting the video streams through multicast transmission techniques, embodiments provide a more scalable video streaming solution relative to conventional techniques.

However, in certain situations, a given network may not have sufficient bandwidth or network throughput to retrieve every ABR profile for every broadcast channel offered by the CDN 210. For example, the client set-top box $240_N$ (which, in the present example, acts as a gateway network device for the client devices $280_{1-N}$ in a user's home network) may not have sufficient bandwidth to subscribe to multicast transmissions for each and every ABR profile for a given broadcast channel. While the client set-top box $240_N$ would conventionally allow the client devices $280_{1-N}$ to select an optimal ABR profile based on their own capabilities and available network resources, the client devices $280_{1-N}$ may not make optimal selections of ABR profiles from the perspective of the user's home network as a whole. For instance, each of the client devices $280_{1-N}$ could select a different ABR profile for the first broadcast channel that is determined to be optimal for the respective client device, such that every available ABR profile for the first broadcast channel. However, as stated above, in this example the user's home network does not have sufficient bandwidth to subscribe to multicast transmissions for each and every ABR profile for the first broadcast channel. As a result, the client devices $280_{1-N}$ may contend with each other for the limited network resources of the home network, with the end result being a non-optimal streaming experience for all of the client devices $280_{1-N}$.

As such, according to one embodiment, the client set-top box $240_N$ (which serves as a network gateway device for the user's home network) could monitor the plurality of client devices $280_{1-N}$ within the network to determine ABR streaming information for a first broadcast channel of a plurality of broadcast channels. For instance, the client set-top box $240_N$ could monitor which ABR profiles the client devices $280_{1-N}$ are requesting from the CDN 210. The client set-top box $240_N$ could further determine one or more performance attributes of the home network. For instance, the client set-top box $240_N$ could determine an available amount of network throughput for the link between the client set-top box $240_N$ and the network device $220_N$.

The client set-top box $240_N$ could then select one or more ABR profiles, of a plurality of ABR profiles for the first broadcast channel, based on the ABR streaming information and the one or more performance attributes of the network. For example, in the above example, the client set-top box $240_N$ could detect that the client devices $280_{1-N}$ are requesting each and every ABR profile that is available for the first broadcast channel, and the client set-top box $240_N$ could determine that there is insufficient network bandwidth available on the link between the client set-top box $240_N$ and the network devices $220_N$ to retrieve all of the requested profiles. As such, the client set-top box $240_N$ could select one or more ABR profiles to satisfy the requests of the client devices $280_{1-N}$, and could generate an updated manifest file specifying the selected one or more ABR profiles for the first broadcast channel. The client set-top box $240_N$ could then transmit the updated manifest file to the plurality of client devices $280_{1-N}$.

Upon receiving the updated manifest file, logic on the client devices $280_{1-N}$ could select one of the one or more ABR profiles within the updated manifest file for the first broadcast channel and could request data packets from the selected ABR profile. Thus, by providing the updated manifest file to the client devices $280_{1-N}$, the client set-top box $240_N$ can effectively force the client devices $280_{1-N}$ to stream only one of the one or more ABR profiles within the updated manifest file for the first broadcast channel, thereby eliminating contention between the client devices $280_{1-N}$ and improving the overall performance of the user's home network. Moreover, by intelligently selecting the one or more ABR profiles to include within the updated manifest file, the client set-top box $240_N$ can take into account which ABR profiles are optimal for the network as a whole, rather than allowing each of the client devices $280_{1-N}$ to select an ABR profile from all the ABR profiles offered by the CDN 210. Additionally, through the use of the updated manifest file, the client set-top box $240_N$ can indirectly control the ABR profile selection behavior of the client devices $280_{1-N}$ without requiring any specialized logic on the client devices $280_{1-N}$.

Figure 3:
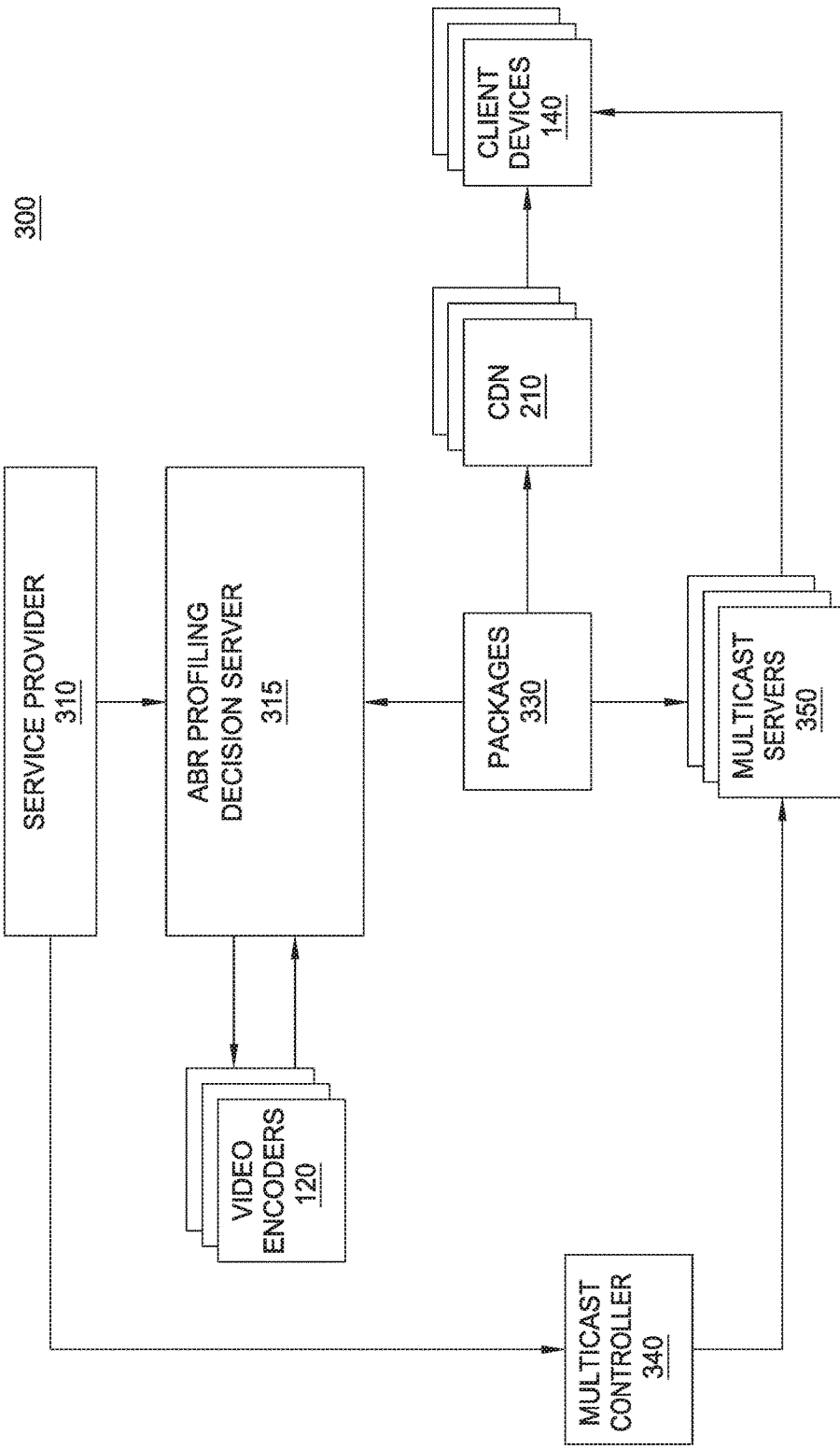
FIG. 3 illustrates a system configured with an Adaptive Bitrate (ABR) profiling decision component, according to one embodiment described herein.

FIG. 3 illustrates a system configured with an ABR profiling decision component, according to one embodiment described herein. As shown, the system 300 includes a service provide 310, an ABR profile decision server 315, a plurality of video encoders 120, packagers 330, CDNs 210, client devices 140, a multicast controller 340 and multicast servers 350.

Generally, the ABR profile decision server 315 is configured to determine an optimal allocation of the video encoders 120 to various broadcast channels, in order to optimally deliver ABR streams to the client devices 140. The ABR profile decision server 315 could then determine an optimal assignment of the set of available video encoders to the plurality of broadcast channels, by, for each of the plurality of broadcast channels, determining a respective number of video encoders to assign to the broadcast channel, based on the client consumption information, and determining a respective set of ABR streams to provide for the broadcast channel, using the assigned video encoders.

Figure 4:
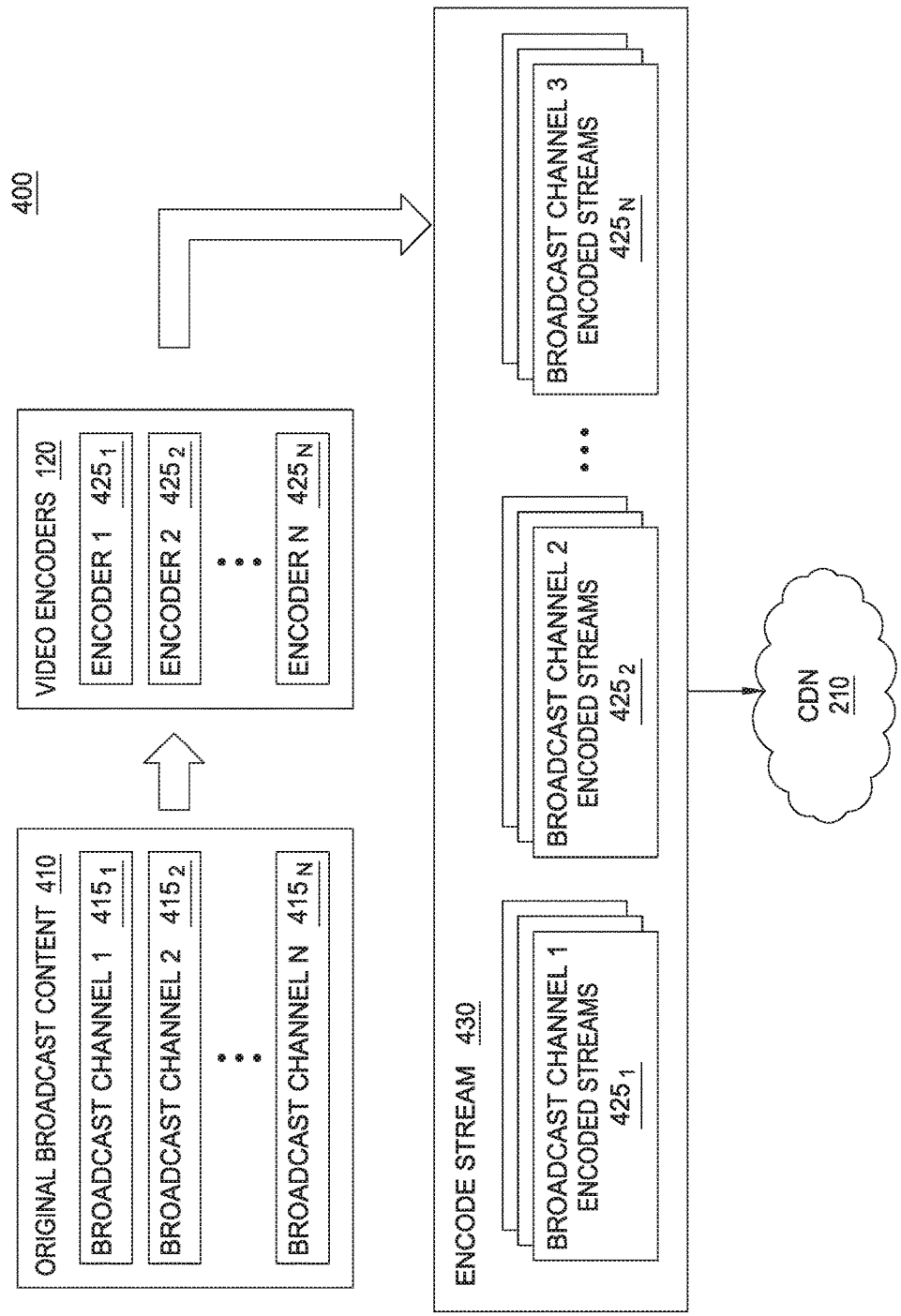
FIG. 4 illustrates a workflow for providing encoded ABR video content for a plurality of broadcast channels, according to one embodiment described herein.

FIG. 4 illustrates a workflow for providing encoded ABR video content for a plurality of broadcast channels, according to one embodiment described herein. As shown, the workflow 400 illustrates original broadcast content 410 (also referred to herein as master streams for broadcast channels), video encoders 120, encoded streams 430 and CDN 210. The encoded ABR video streams 430 produced by the encoders $415_{1-N}$, depicted as the broadcast channel encoded streams $425_{1-N}$, can then be provided to CDN 210 for distribution to client devices. As discussed above, the CDN 210 can be configured to provide the encoded streams 430 to the client devices using various techniques (e.g., unicast communications, multicast communications, etc.). In a particular embodiment, the CDN 210 is configured to transmit requested streams to the client devices using unicast communications, and the encoded streams 430 can also be provided to a multicast server (not shown) for transmission to client devices using multicast communications.

Figure 5A:
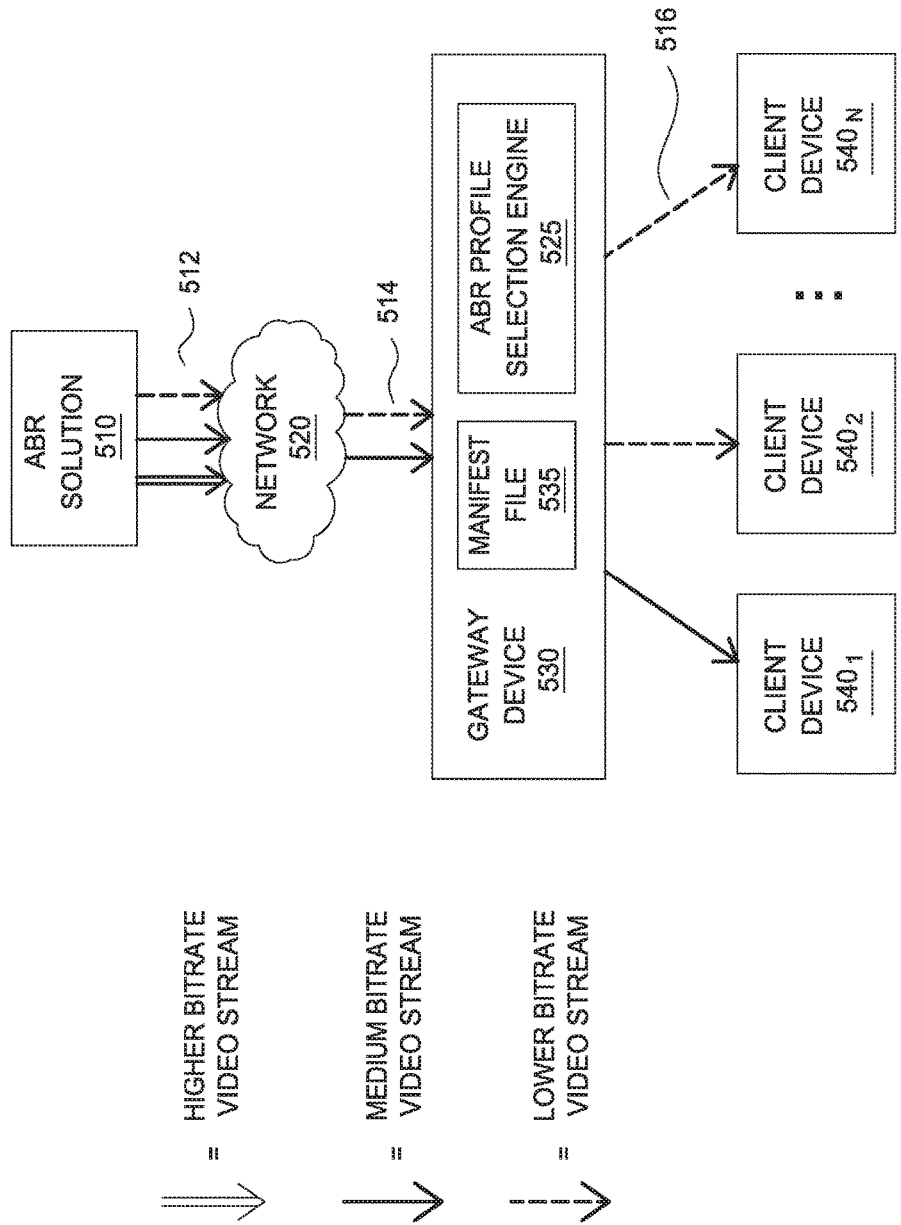
FIGS. 5A-B illustrate exemplary network environments configured with a ABR profile selection engine, according to embodiments described herein.
Figure 5B:
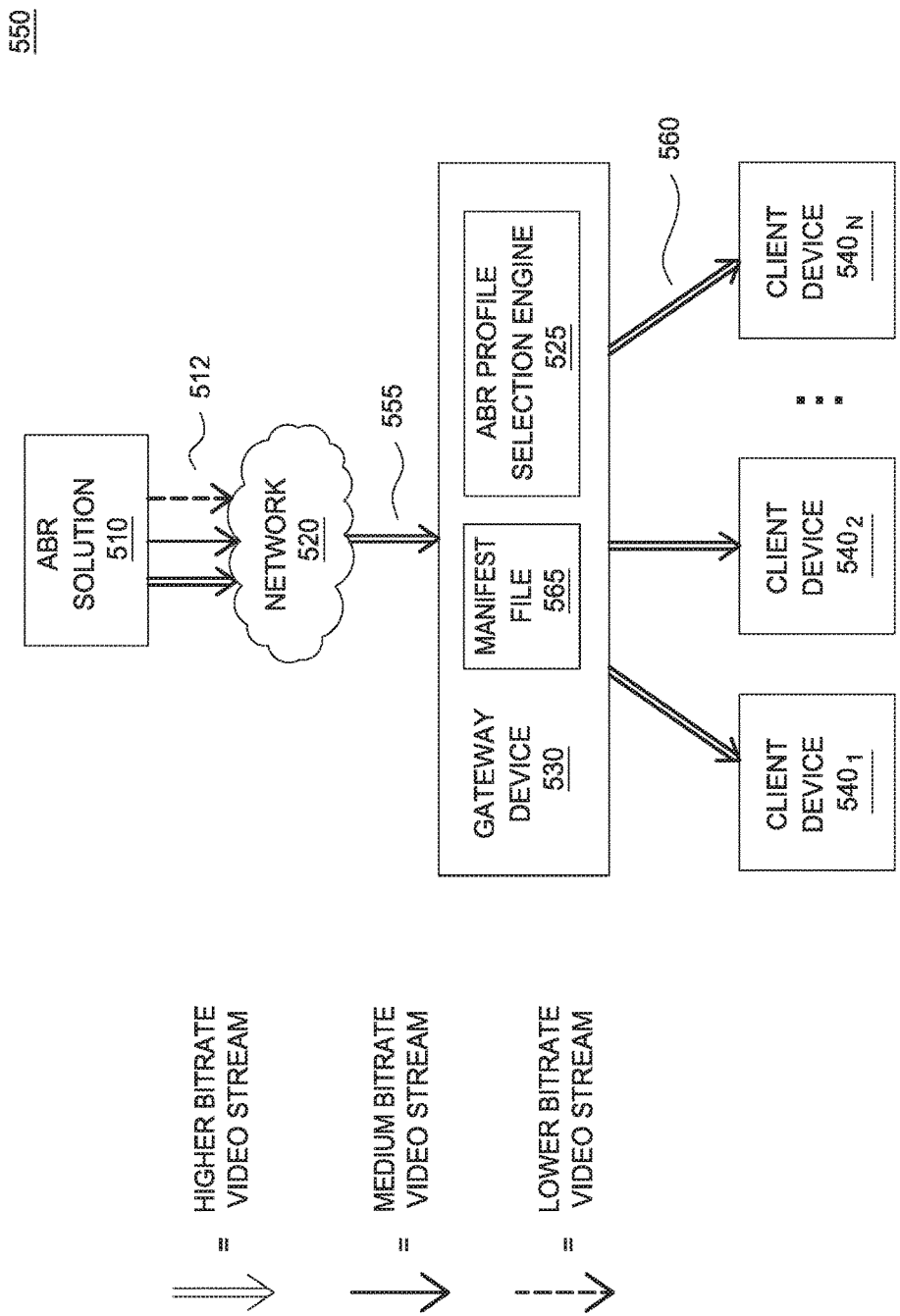

FIGS. 5A-B illustrate exemplary network environments configured with a ABR profile selection engine, according to embodiments described herein. As shown, the network 500 includes an ABR solution 510, a network 520, a network gateway device 530 and client devices $540_{1-N}$. The gateway device 530 includes a manifest file 535 and an ABR profile selection engine 525. As shown in FIG. 5A, the ABR solution 510 is currently sending the higher, medium and lower bitrate video streams (arrows 512) for a particular broadcast channel to the network 520 via multicast transmissions. In turn, the network 520 is sending only the medium and lower bitrate video streams (arrows 514) to the gateway device 530. In the depicted example, the client device $540_1$ has subscribed to the medium bitrate video stream, while the client devices $520_2$ and $540_N$ have subscribed to the lower bitrate video stream (arrows 516).

As discussed above, while client devices may be configured with logic that attempts to select an optimal ABR profile based on information available to the client device, these ABR profile selections are frequently non-optimal for the network as a whole. In the present example, the client devices $540_{1-N}$ may be contending with one another for a limited amount of bandwidth between the gateway device 530 and the network 520. For example, while the network link between the gateway device 530 and the network 520 may have sufficient bandwidth to retrieve the higher bitrate video stream for the particular broadcast channel, if the medium and lower bitrate streams were not being retrieved, the client devices $540_{1-N}$ may have no way of knowing this. As an example, the client devices $540_2$ and $540_N$ may be configured to select the lower bitrate video stream because the client devices $540_2$ and $540_N$ are mobile devices with a lower resolution display, which in turn could prevent the client device $540_1$ from being able to retrieve the higher bitrate video stream. Thus, the ABR profile selection for network of the client devices $540_{1-N}$ is non-optimal.

As such, the ABR profile selection engine 525 could monitor the ABR profile selections of the client devices $540_{1-N}$ and could determine that sufficient network resources are available to retrieve the higher bitrate video stream, if the medium and lower bitrate streams were not being retrieved. As such, as shown in the network 550 of FIG. 5B, the ABR profile selection engine 525 could generate an updated manifest file 565 specifying only ABR profile for the higher bitrate video stream for the particular broadcast channel, and the ABR profile selection engine 525 could transmit the updated manifest file 565 to the client devices $540_{1-N}$. Upon processing the updated manifest file 565, the client devices $540_{1-N}$ could determine that the lower and medium bitrate video streams are no longer available, and thus could subscribe to the higher bitrate video stream for the particular broadcast channel. In turn, the gateway device 540 could subscribe to the multicast transmission of the higher bitrate video stream (arrows 555) from the network 520, and could transmit the higher bitrate video stream (arrows 560) to the client devices $540_{1-N}$. As such, by eliminating the contention over network resources between the client devices $540_{1-N}$, the ABR profile selection engine 525 can provide a more optimal streaming experience for the overall network.

In one embodiment, the ABR profile selection engine 525 is configured to monitor the client devices $540_{1-N}$ over a period of time to determine a pattern of behavior with respect to switching between the available ABR profiles for a given broadcast channel, and to consider such a pattern of behavior in selecting the one or more ABR profiles for the broadcast channel. For example, in some situations, the ABR profile selection engine 525 may monitor the pattern of behavior and may determine that the client devices $540_{1-N}$ are repeatedly switching between ABR profiles offered by the ABR solution 510 for the particular broadcast channel. Based on such a determination, the ABR profile selection engine 525 could determine that at least some of the client devices are competing with one another for network resources, and can determine to consolidate the ABR profiles being requested by the client devices (e.g., as shown in FIG. 5B, where all of the client devices $540_{1-N}$ ultimately switch to the higher bitrate video stream). In other instances, where the ABR profile selection engine 525 determines that the pattern of behavior indicates that the client devices are retrieving different ABR profiles but do not appear to be competing for limited network resources (e.g., when the client devices do not appear to be repeatedly switching between different ABR profiles), the ABR profile selection engine 525 could allow the client devices to continue with their selected ABR profiles.

According to one embodiment, the ABR profile selection engine 525 can consider a determined type of each client device $540_{1-N}$ in selecting the one or more ABR profiles to include in the updated manifest file. For example, the ABR profile selection engine 525 could determine that the client devices $540_{1,2}$ are mobile devices (which may typically have lower resolution display devices), while the client device $540_N$ is a set-top box (which may typically be connected to a higher resolution display device). Based on the determined types, the ABR profile selection engine 525 could then select the one or more ABR profiles to include in the updated manifest file 565. For example, if the ABR profile selection engine 525 determines that the available network resources permit, the ABR profile selection engine 525 could determine to include an ABR profile for a medium bitrate stream to be consumed by the mobile devices on the network and could select the higher bitrate video stream to be consumed by the set-top box. In one embodiment, the ABR profile selection engine 525 is configured to track the ABR profile selections of the various client devices $540_{1-N}$ and to give a preference to ABR profiles frequently used by the client devices. For example, if the ABR profile selection engine 525 determines that a video profile is repeatedly downloaded by a particular client device, the ABR profile selection engine 525 could learn that the particular client device is able to use the video profile, and can persist such information for use in subsequent arbitration choices between ABR profiles. For example, the ABR profile selection engine 525 could give a preference to the known video profile over another video profile, based on the persisted information that the particular client device has demonstrated an ability to use known video profile in the past.

Figure 6B:
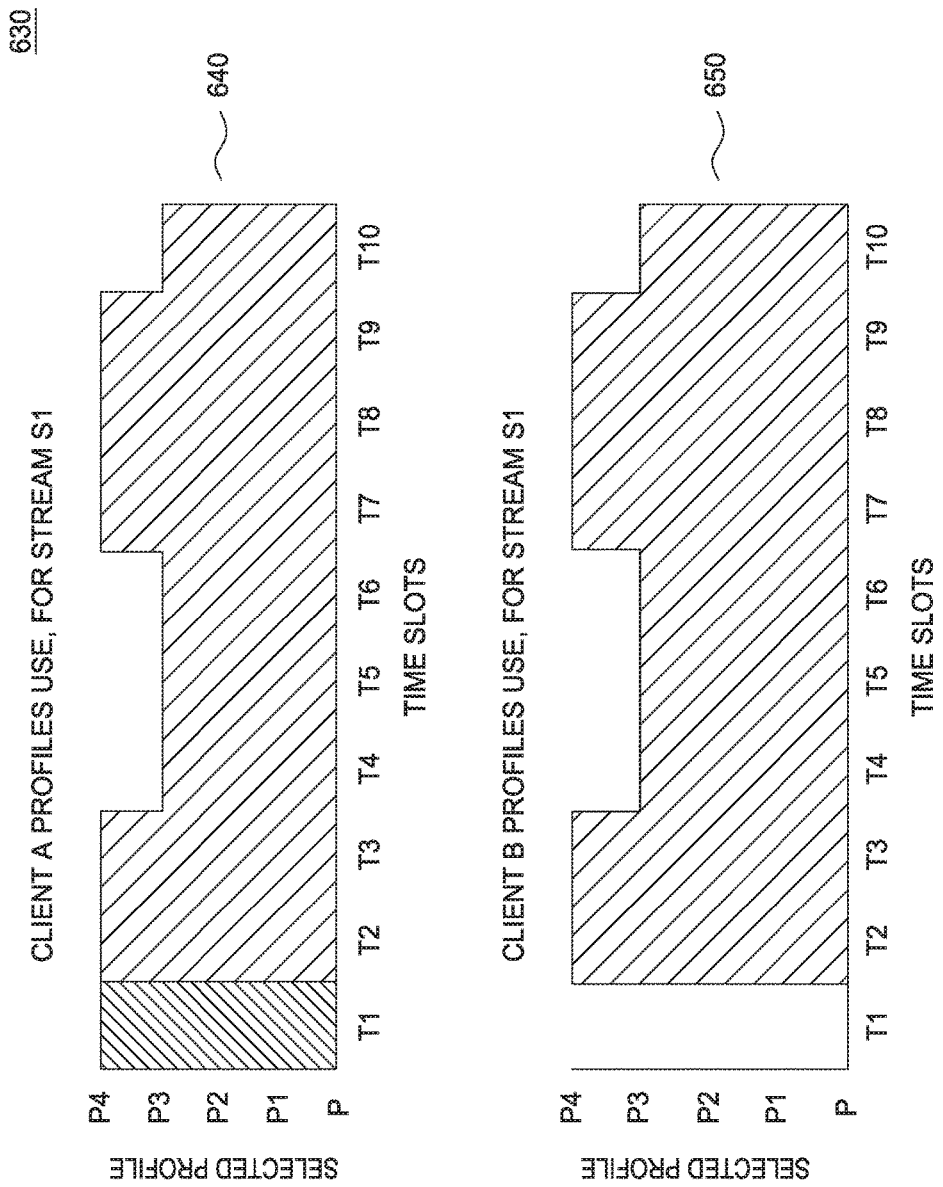

An example of this is shown in FIGS. 6A-B, which are bar graphs illustrating ABR profiles selected by client devices, according to embodiments described herein. As shown, the example 600 depicted in FIG. 6A includes a first bar graph 610 and a second bar graph 620, where the first bar graph 610 illustrates the ABR profile selection of a first client and the second bar graph 620 illustrates the ABR profile selection of a second client device. As shown in the graph 610, the first client device was able to retrieve packets of video data using the highest quality ABR profile P4 at time slots T1 and T2. At T2, the second client began retrieving packets of video data using the ABR profile P2. For purposes of this example, assume that the network uplink for the network containing the first and second client devices does not have sufficient bandwidth to retrieve both the data packets for the profile P4 and the profile P2 simultaneously. As a result, at time slot T3, both the client devices drop to the ABR profile P2. In such a scenario, since the first and second client devices are sharing a same ABR profile, more network throughput will be available for the uplink between the network gateway device and the upstream network device. As such, at time slot T4, the first client device begins requesting the ABR profile P3, and the second client device begins requesting the ABR profile P3 at time slot T5.

However, at time slot T6, the first client device switches to the ABR profile P4, while the second client device remains on the ABR profile P3. In such an example, assume that the network gateway device does not have sufficient network throughput on the uplink to retrieve data packets for both ABR profiles P3 and P4 simultaneously. As such, before the second client device can switch to the ABR profile P4, both the first and second client devices detect that they are not receiving packets for their requested ABR streams in time (i.e., the packets will not arrive before playback of the corresponding chunks of video data), and thus at time slot T7, the first client device drops back to ABR profile P2 and the second client device drops back to profile P1. Generally, such a process could continue indefinitely, as the client devices contend with one another for network resources, and the ABR profile selection for the network never reaches an optimal state.

In contrast, FIG. 6B illustrates an example 630 of the network, after the ABR profile selection engine 525 has selected the one or more ABR profiles for the particular broadcast channel and has transmitted an updated manifest file to the first and second client devices. As shown in the bar graphs 640 and 650, the ABR profile selection engine 525 has determined that the network can support the ABR profile P4 at time slots T1, T2, T3, T7, T8 and T9, and the ABR profile selection engine 525 has transmitted to the client devices a manifest file containing only the ABR profile P4 for the stream S1 at these time slots. Likewise, the ABR profile selection engine 525 has determined at time slots T4, T5, T6 and T10 that the network can only support the ABR profile P3 for the stream S1, and has transmitted to the client devices a manifest file specifying only the ABR profile P3 at these time slots. By doing so, the ABR profile selection engine 525 can effectively force the first and second client devices to share a single ABR profile when simultaneously viewing the broadcast stream S1, thereby optimizing the streaming experience for the client devices and the performance of the network as a whole.

Figure 7A:
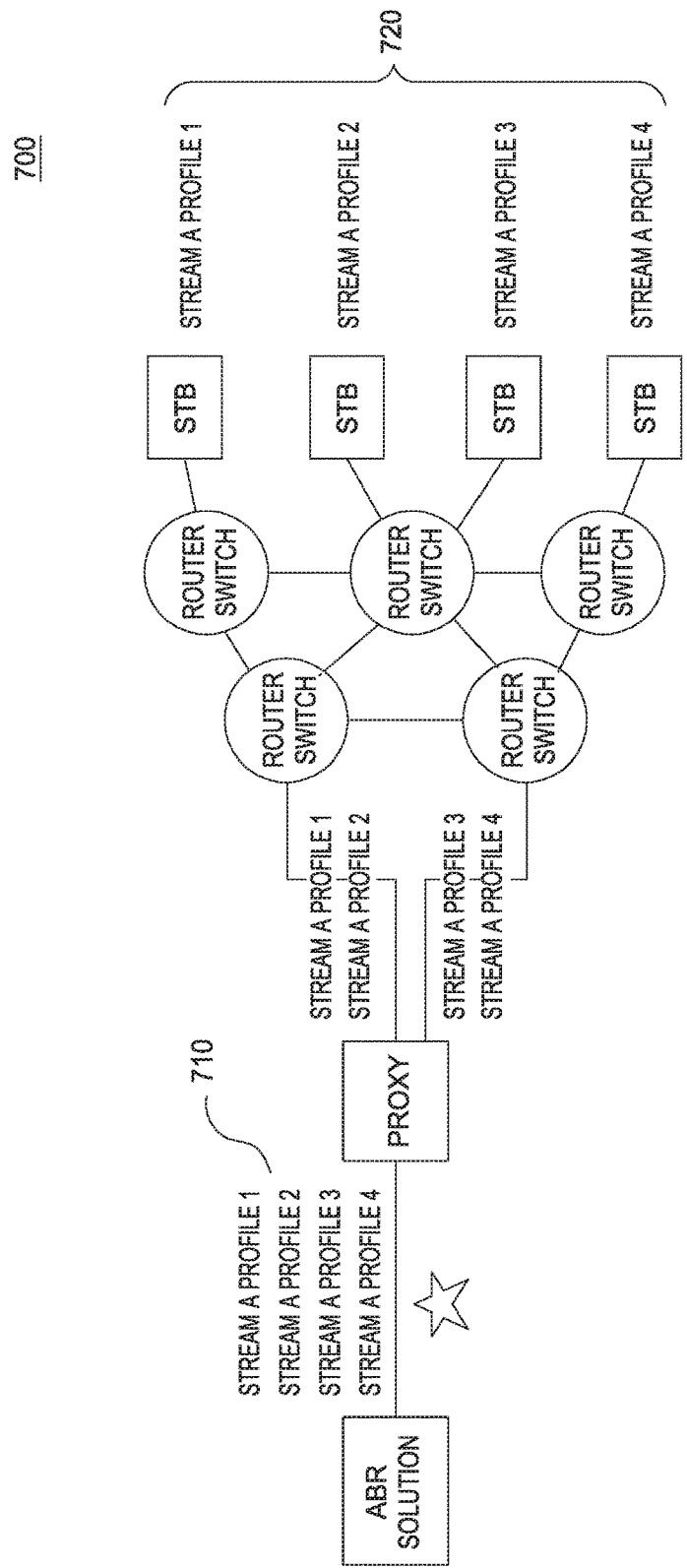
FIGS. 7A-B illustrate exemplary network environments configured with a ABR profile selection engine, according to embodiments described herein.
Figure 7B:
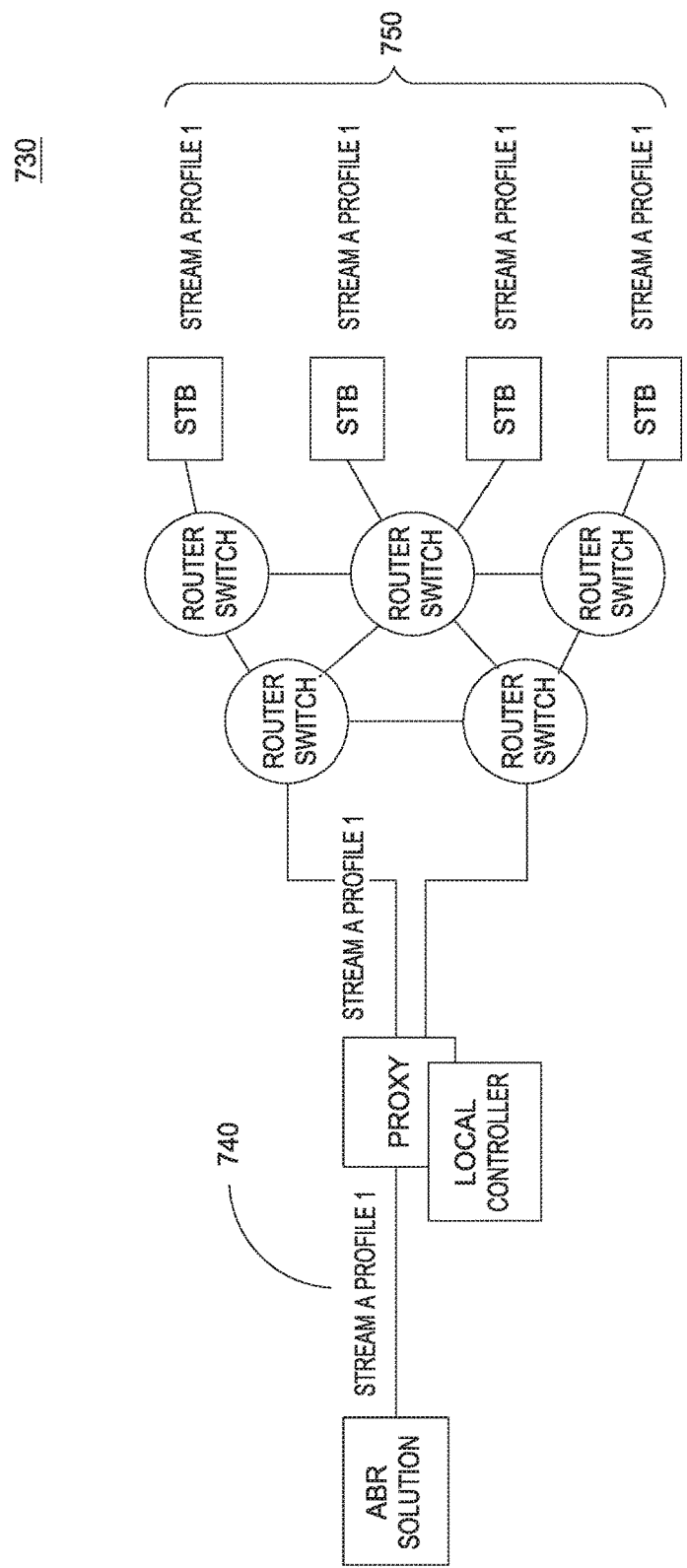

Generally, while the above examples involve network congestion on the uplink between the network gateway devices and the upstream network device, more generally such network congestion can occur in other locations within the network as well. FIGS. 7A-B illustrate exemplary network environments configured with a ABR profile selection engine, according to embodiments described herein. For example, in the network 700 shown in FIG. 7A, the set-top box (STB) client devices are requesting ABR streams from ABR profiles 1, 2, 3 and 4 720. This has resulted in network congestion between the ABR solution and the proxy device, as shown at link 710.

In one embodiment, the proxy server includes a local controller configured with the ABR profile selection engine 525. As shown in FIG. 7B, the network 730 includes such a local controller. Generally, the ABR profile selection engine 525 can monitor the ABR profile selections for the particular broadcast stream at the proxy device, and can select one or more ABR profiles based on the monitor ABR profile selections and the network conditions at the proxy device. In the depicted example, the ABR profile selection engine 525 has selected the stream A profile 1 (i.e., the highest quality ABR profile, in this example). The ABR profile selection engine 525 can provide an updated manifest file to the downstream router/switches, specifying only the selected ABR profile 1. Such an updated manifest file can then be forwarded through the network to the STB clients, thereby causing the STB clients to request profile 1 for the stream A. That is, as the updated manifest file indicates that only profile 1 is available for the stream A, the STB client devices will effectively be forced to request the ABR profile 1. Thus, as shown, the previously congested link between the ABR solution and the proxy device now transmitting only the stream A profile 1 data 740, while the STB client devices are all subscribing to the profile 1 for stream A. Doing so alleviates the upstream network congestion, while ensuring that the video streaming experience is optimized across the STB client devices.

Figure 8:
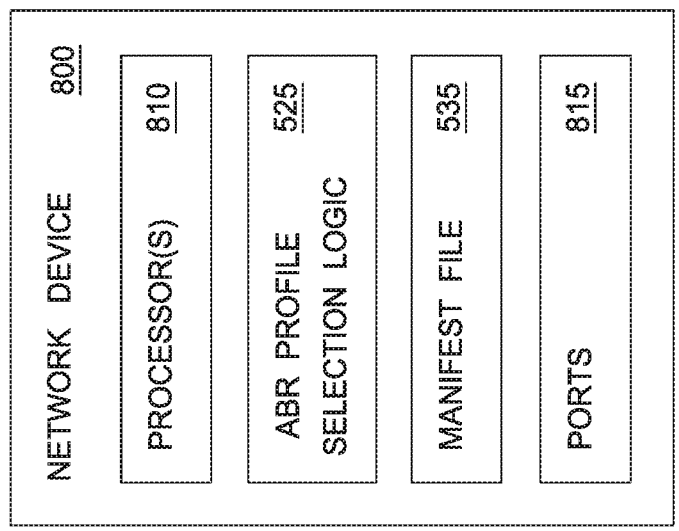
FIG. 8 illustrates a network device configured with ABR profile selection logic, according to one embodiment described herein.

FIG. 8 illustrates a network device configured with ABR profile selection logic, according to one embodiment described herein. As shown, the network device 800 includes, without limitation, processors 810, ABR profile selection logic 525 (also referred to herein as ABR profile selection engine 525), a manifest file 535 and communication ports 815. The processor 810 may be any processing element capable of performing the functions described herein. The processor 810 represents a single processor, multiple processors, a processor with multiple cores, and combinations thereof. The manifest file 535 may contained with a memory device (not shown), which may be either volatile or non-volatile memory and may include RAM, flash, cache, disk drives, and the like. The network device may also include a control plane for configuring and managing the forwarding logic.

Generally, the ABR profile selection logic 525 can be configured to monitor a plurality of client devices within a network to determine adaptive bitrate ABR streaming information for a first broadcast channel of a plurality of broadcast channels. The ABR profile selection logic 525 can additionally determine one or more performance attributes of the network. For instance, the ABR profile selection logic 525 could determine a measure of available network throughput for an uplink port of the ports 815. The ABR profile selection logic 525 could then select one or more ABR profiles of a plurality of ABR profiles for the first broadcast channel, based on the ABR streaming information and the one or more performance attributes of the network. The ABR profile selection logic 525 could generate the manifest file 535 specifying the selected one or more ABR profiles for the first broadcast channel, and could transmit the manifest file 535 to the plurality of client devices. Doing so enables the ABR profile selection logic 525 to indirectly control the ABR profile selection of the plurality of client devices.

FIG. 9 is a flow diagram illustrating a method of selecting one or more ABR profiles for a broadcast channel within a network, according to one embodiment described herein. As shown, the method 900 begins at block 910, where the ABR profile selection logic 525 monitors, at a network gateway device for a network, a plurality of client devices within the network to determine ABR streaming information for a first broadcast channel of a plurality of broadcast channels. The ABR profile selection logic 525 determines one or more performance attributes of the network (block 915). The ABR profile selection logic 525 then selects one or more ABR profiles of a plurality of ABR profiles for the first broadcast channel, based on the ABR streaming information and the one or more performance attributes of the network (block 920). Additionally, the ABR profile selection logic 525 generates an updated manifest file specifying the selected one or more ABR profiles for the first broadcast channel (block 925), and transmits the updated manifest file to the plurality of client devices (block 930, and the method 900 ends.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   monitoring, at a network gateway device for a network, a plurality of client devices within the network to determine adaptive bitrate (ABR) streaming information for a first broadcast channel of a plurality of broadcast channels;
   determining one or more performance attributes of the network;
   analyzing the ABR streaming information to determine a pattern of behavior, across the plurality of client devices within the network, in switching between the plurality of ABR profiles for the first broadcast channel, wherein the pattern of behavior comprises a frequency at which the plurality of client devices are switching between a plurality of ABR profiles for the first broadcast channel;
   selecting one or more ABR profiles of the plurality of ABR profiles for the first broadcast channel, based on the ABR streaming information, the determined pattern of behavior and the one or more performance attributes of the network;
   generating an updated manifest file specifying the selected one or more ABR profiles for the first broadcast channel; and
   transmitting the updated manifest file to at least one of the plurality of client devices.

2. The method of claim 1, wherein at least one of the plurality of ABR profiles for the first broadcast channel is omitted from the updated manifest file.

3. The method of claim 1, wherein the one or more performance attributes of the network include at least one of (i) a measure of network throughput, (ii) a measure of network bandwidth, and (iii) a measure of congestion at an upstream network node.

4. The method of claim 1, wherein the updated manifest file contains only a single ABR profile for the first broadcast channel, and wherein transmitting the updated manifest file to the at least one client device causes the at least one client device to stream the first broadcast channel using the single ABR profile.

5. The method of claim 1, further comprising:
upon transmitting the updated manifest file to the at least one client device, continuing to monitor the plurality of client devices within the network to determine subsequent ABR streaming information for the first broadcast channel of the plurality of broadcast channels; and
refining the updated manifest file based on the subsequent ABR streaming information.

6. The method of claim 1, further comprising:
determining, for each of the plurality of client devices within the network, respective device information characterizing one or more attributes of the respective client device,
wherein selecting the one or more ABR profiles of the plurality of ABR profiles for the first broadcast channel, is further based on the determined device information for the plurality of client devices.

7. A network device, comprising:
one or more computer processors; and
logic on a non-transitory medium that, when executed by operation of the one or more computer processors, performs an operation comprising:
monitoring, at the network device for a network, a plurality of client devices within the network to determine ABR streaming information for a first broadcast channel of a plurality of broadcast channels;
determining one or more performance attributes of the network;
analyzing the ABR streaming information to determine a pattern of behavior, across the plurality of client devices within the network, in switching between the plurality of ABR profiles for the first broadcast channel wherein the pattern of behavior comprises a frequency at which the plurality of client devices are switching between a plurality of ABR profiles for the first broadcast channel;
selecting one or more ABR profiles of the plurality of ABR profiles for the first broadcast channel, based on the ABR streaming information, the determined pattern of behavior and the one or more performance attributes of the network;
generating an updated manifest file specifying the selected one or more ABR profiles for the first broadcast channel; and
transmitting the updated manifest file to at least one of the plurality of client devices.

8. The network device of claim 7, wherein at least one of the plurality of ABR profiles for the first broadcast channel is omitted from the updated manifest file.

9. The network device of claim 7, wherein the one or more performance attributes of the network include at least one of (i) a measure of network throughput, (ii) a measure of network bandwidth, and (iii) a measure of congestion at an upstream network node.

10. The network device of claim 7, wherein the updated manifest file contains only a single ABR profile for the first broadcast channel, and wherein transmitting the updated manifest file to the at least one client device causes the at least one client device to stream the first broadcast channel using the single ABR profile.

11. The network device of claim 7, the operation further comprising:
upon transmitting the updated manifest file to the at least one client device, continuing to monitor the plurality of client devices within the network to determine subsequent ABR streaming information for the first broadcast channel of the plurality of broadcast channels; and
refining the updated manifest file based on the subsequent ABR streaming information.

12. The network device of claim 7, the operation further comprising:
determining, for each of the plurality of client devices within the network, respective device information characterizing one or more attributes of the respective client device,
wherein selecting the one or more ABR profiles of the plurality of ABR profiles for the first broadcast channel, is further based on the determined device information for the plurality of client devices.

13. A network device, comprising:
one or more computer processors; and
logic on a non-transitory medium that, when executed by operation of the one or more computer processors, performs an operation comprising:
monitoring, at the network device, ABR profile requests from a plurality of downstream client devices to determine ABR streaming information for a first broadcast channel of a plurality of broadcast channels;
determining one or more performance attributes of a link between the network device and an upstream network device;
analyzing the ABR streaming information to determine a pattern of behavior, across the plurality of client devices within the network, in switching between the plurality of ABR profiles for the first broadcast channel wherein the pattern of behavior comprises a frequency at which the plurality of client devices are switching between a plurality of ABR profiles for the first broadcast channel;
selecting one or more ABR profiles of the plurality of ABR profiles for the first broadcast channel, based on the ABR streaming information, the determined pattern of behavior and the one or more performance attributes;
generating an updated manifest file specifying the selected one or more ABR profiles for the first broadcast channel; and
transmitting the updated manifest file to at least one downstream network device.

14. The network device of claim 13, the operation further comprising:
upon transmitting the updated manifest file to the at least one downstream network device, continuing to monitor subsequent ABR profile requests and the link between the network device and the upstream network device; and
refining the updated manifest file based on the subsequent ABR profile requests and a subsequent state of the link between the network device and the upstream network device.

15. The network device of claim 14, wherein the one or more performance attributes of the link include at least one of (i) a measure of network throughput, (ii) a measure of network bandwidth, and (iii) a measure of congestion at an upstream network node.

16. The network device of claim 15, wherein the updated manifest file contains only a single ABR profile for the first broadcast channel, and wherein transmitting the updated manifest file to the at least one downstream network device causes the plurality of downstream client devices to stream the first broadcast channel using the single ABR profile.

\* \* \* \* \*